United States Patent [19]
Iglesias

[11] 3,850,162
[45] Nov. 26, 1974

[54] ENDOSCOPE WITH CONTINUOUS IRRIGATION

[76] Inventor: Jose J. Iglesias, 1341 North Ave., Elizabeth, N.J. 07208

[22] Filed: June 8, 1973

[21] Appl. No.: 368,186

Related U.S. Application Data

[63] Continuation-in-part of Ser. No. 268,806, July 3, 1972.

[52] U.S. Cl. ............................... 128/6, 128/303.15
[51] Int. Cl. .......................... A61b 1/06, A61b 1/12
[58] Field of Search ........... 128/4, 6, 7, 240, 303.15

[56] References Cited
UNITED STATES PATENTS

| | | | |
|---|---|---|---|
| 2,038,393 | 4/1936 | Wappler | 128/7 |
| 2,564,809 | 8/1951 | Levene | 128/240 |
| 2,691,370 | 10/1954 | Wallace | 128/6 |
| 3,089,484 | 5/1963 | Hett | 128/6 |

Primary Examiner—Lucie H. Laudenslager
Attorney, Agent, or Firm—Scrivener Parker Scrivener and Clarke

[57] ABSTRACT

An endoscope for transurethral examination and operations has two conduits within the sheath of the instrument, one to provide continuous inflow of clear irrigating fluid to the operative field, and the second to provide continuous outflow of turbid fluid from the operative field, the distal ports of the two conduits being on opposite sides (i.e., proximate and distal) of the objective lens of the telescope of the instrument, and the tube of the telescope being concentric with the sheath to provide increased space within the sheath to permit conduits of sufficient size to accommodate the required flow of fluid.

2 Claims, 3 Drawing Figures

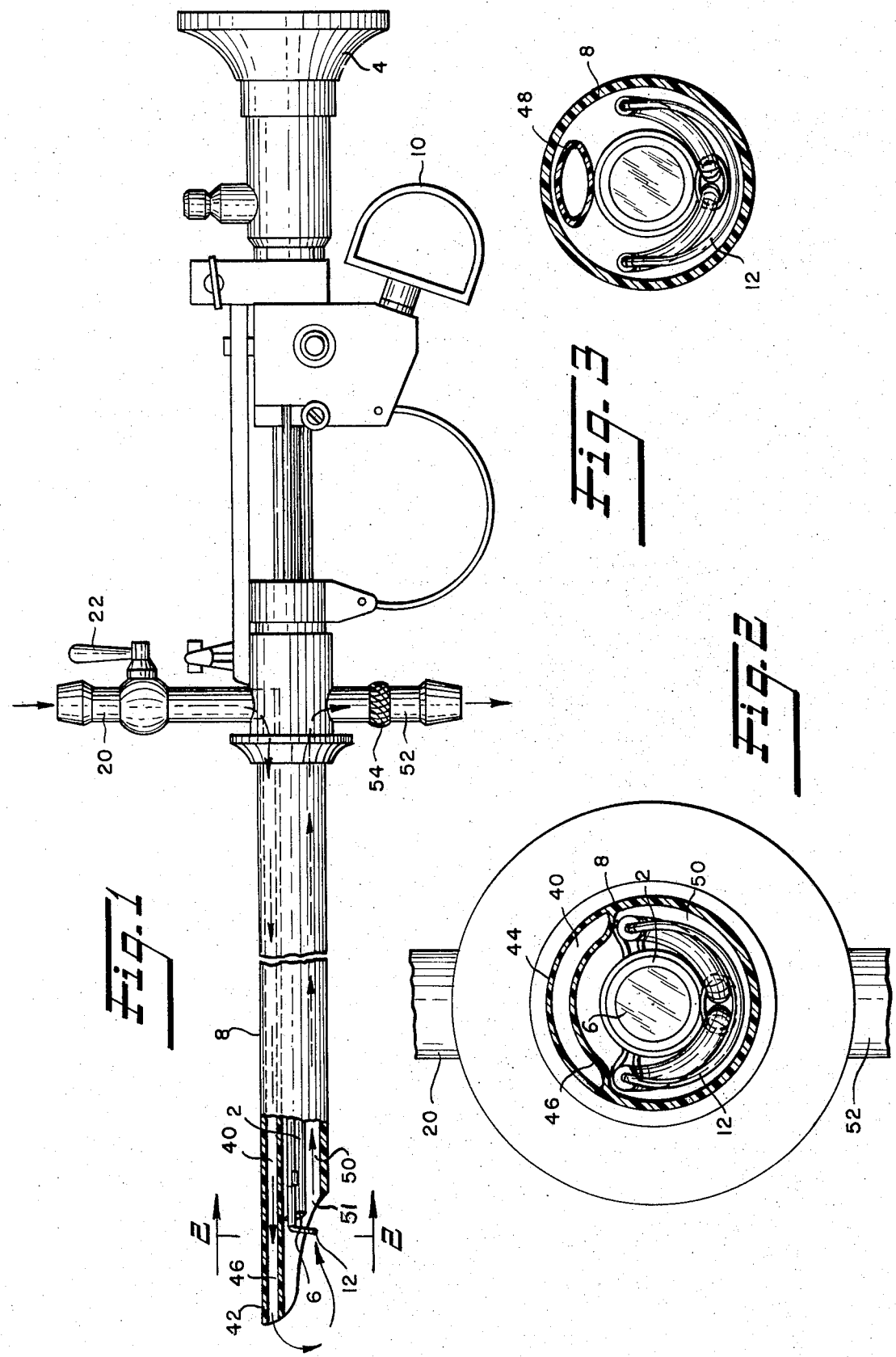

3,850,162

ENDOSCOPE WITH CONTINUOUS IRRIGATION

RELATION TO OTHER CASES

This application is a continuation-in-part of my copending application Ser. No. 268,806, filed July 3, 1972, for Resectoscope With Continuous Irrigation.

BACKGROUND OF THE INVENTION

Endoscopic instruments are widely used in urology and are introduced through the urethra into the bladder in order to visualize the bladder and the prostatic urethra and permit the performance of endoscopic examination of them and the various operative procedures. Typical instruments are the resectoscope, urethro-cystoscope, lithotriptor and biopsy endoscopic forcep. All of these instruments include an elongated tubular sheath within which are located a telescope and operative instruments. In this specification the invention will be described in specific connection with the endoscopic instrument known as the resectoscope, but this is for illustration only as the invention is applicable to all urological endoscopic instruments, as will be more particularly described.

A resectoscope is an instrument used by surgeons to perform transurethral resections of the prostate and bladder. In general, it comprises an optical telescope having an elongated tube, an eyepiece and an objective lens, an elongated cylindrical sheath surrounding and spaced from the telescope tube, and a cutting loop assembly within the sheath supported by the telescope and movable longitudinally thereof so that part of the assembly may be moved externally of the distal end of the sheath to perform the resection of the tissues.

DESCRIPTION OF THE DRAWINGS

FIG. 1 is a side view, partly in section, of a resectoscope according to the invention;

FIG. 2 is a sectional view taken on line 2—2 of FIG. 1, and

FIG. 3 is a view similar to FIG. 2 showing a modified form of the invention.

In FIG. 1 of the drawings there are illustrated the parts of a conventional resectoscope and the improved means provided by this invention. The conventional instrument comprises a telescope tube 2 having an eyepiece 4 at its proximate end and an objective lens 6 at its distal end. A sheath 8 of hollow cylindrical form surrounds the telescope tube in spaced relation thereto and serves as a protective housing for the telescope and other operative parts of the resectoscope.

Other parts of the resectoscope are illustrated in FIG. 1, but as these do not form part of the invention and are well known and conventional they will not be further described here. In general, however, in performing a resection the finger loop 10 is operated manually by the surgeon in a direction longitudinal of the telescope and sheath to cause the cutting loop assembly 12 to move in the same direction into and out of the distal end of the sheath to perform the resection.

In the use of any endoscopic instrument proper visualization requires the presence of a clear fluid medium at the operative field, and in known instruments this is provided by clear fluid flowing to the field through the sheath from an overhead reservoir through inlet tube 20 controlled by stopcock 22. However, urine and blood due to the resected tissues produce a turbid medium at the operative field and vision is made possible only by maintaining an inflow of clear fluid. Under certain operative conditions the turbidity is sufficient to impair vision and at this point the surgeon must stop the operation and detach the working element from the sheath in order to empty the turbid bloody fluid from the bladder. This interruption of the surgical procedure must be performed frequently when presently known resectoscopes are used, and these periodic interruptions produce dangerous difficulties such as temporary loss of visual orientation, prolonged bleeding, extended operative time, and sometimes require further anesthesia. To avoid these difficulties some surgeons maintain a clear medium at the operating field by increasing the volume of the clear fluid inflow by raising the exterior reservoir but this practice increases the intravesical hydrostatic pressure, overdistending the bladder and making possible dangerous complications such as perforation of the bladder, extravasation of fluid, and entrance of irrigating fluid into the circulatory system of the body through open veins at resected tissues, which may produce hypervolemic and toxic syndromes which may be fatal. The transurethral resection must be performed under low pressure, and some surgeon obtain this by suprapubic puncture of the bladder with a trocar to cause outflow of turbid fluid.

SUMMARY OF THE INVENTION

The invention provides an endoscopic urological instrument with a conduit within and extending longitudinally of the sheath having its distal port positioned at the distal side of the objective lens of the telescope, while the un-occupied space within the sheath surrounding the telescope tube provides a second conduit the distal port of which is proximate to the same lens. Because of this arrangement a flow of clear liquid can always be provided in front of the objective lens, thus assuring constant clear vision of the operative field and permitting the low intravesical hydrostatic pressure which is essential to transurethral surgery, while obviating any necessity for suprapubic puncture.

DESCRIPTION OF THE INVENTION

Means are provided by the invention for introducing a continuous flow of clear irrigating fluid to the operative field, and in the resectoscope such means comprise a conduit 40 within the upper part of the sheath 8 and extending throughout the length of the sheath, including the beak 42. In the preferred embodiment of the invention this conduit is formed by a wall 44, which in this embodiment is the upper part of the sheath itself, and a lower wall 46 which is spaced below the upper wall 44. At or adjacent the proximate end of the sheath the conduit 40 is connected to tube 20 and, in a resectoscope, through tube 20 to a source of clear irrigating fluid.

In further accordance with the invention the sheath 8 and telescope tube 2 are made of such lengths that the objective lens 6 is proximate to the distal end of the conduit 40, and in a resectoscope, because of this relative location of the parts, clear fluid will always flow through this conduit to the distal side of the objective lens of the telescope.

In further accordance with the invention a second conduit 50 is provided within the sheath and below the conduit 40 through which in the operation of a resectoscope turbid fluid is removed from the operative field.

In order to promote and facilitate increased flow of fluid through this conduit the telescope tube 2 is lowered from its conventional position at the upper part of the sheath and is made concentric with the sheath and positioned below the conduit 40, thus enlarging the space available for conduit 40 and clearing the space within the sheath available for the flow of fluid. At its distal end the conduit 50, which is the space within the sheath not occupied by conduit 40, the telescope tube and other necessary parts, opens through port 51 which is proximate to the objective lens 6 of the telescope, and at its proximate end this conduit is connected to external tube 52, the passage through which is controlled by rotary valve operator 54. In the operation of a resectoscope the provision of the enlarged, clear passage 50 for the outflow of turbid fluid from the operative field is of great importance as that fluid often carries with it clots and pieces and particles of tissue which have been removed or dislodged by the operative procedure.

As stated above, the invention provides a universally useful endoscopic instrument which is constructed and operable to provide a continuous supply of clear fluid distal to the objective lens of the telescope of the instrument, thus insuring continuous clear visualization of the operative field. Because of the different fluid flow requirements of various endoscopic instruments the direction and nature of fluid flow through conduits 40 and 50 will depend on the endoscopic instrument being used.

Thus, in the use of a resectoscope, which is the instrument disclosed in the drawings and described above, clear irrigating fluid will be supplied to conduit 40 through external connecting tube 20 and the pattern of fluid flow will be that shown by arrows in FIG. 1 of the drawings, in which clear fluid flows outwardly from the discharge end of the conduit 40, into the operative field where it becomes turbid and may pick up particles of tissue, and from there flows downwardly to the distal port of the conduit 50 which is located proximate to and below both the objective lens of the telescope and the discharge port of conduit 40, the flow into conduit 50 being accelerated in the usual use of a resectoscope, by negative pressure in conduit 50 produced at external tube 52. The conduit 40 is smaller in cross section than conduit 50 and it is important in the use of a resectoscope that conduit 40 be used for the inflow of clear irrigating fluid, as if it were used for outflowing turbid fluid it could, because of its size, become clogged with bits and particules of tissue removed by the resection.

When the instrument provided by the invention is used for certain other transurethral operations, for example when it is used as a urethro-cystoscope the fluid flow through conduits 40 and 50 will be reversed because in such operations some distension of the bladder is necessary and there is no possibility of the smaller conduit 40 being plugged by tissue removed in the operation. In such cases the conduit 40 will be the outflow conduit and external tube 20 will be connected accordingly, while the conduit 50 within the sheath will be the inflow conduit and will be connected through external tube 52 to the reservoir of clear irrigating fluid.

In a second embodiment of the invention, which is disclosed in FIG. 3, the conduit above the telescope tube is made separate from the sheath, such a conduit being shown at 48.

I claim:

1. A urological endoscopic instrument, comprising an elongated cylindrical beaked sheath through which an instrument is extended axially to a position outside the sheath for performing a urological procedure, a telescope tube extending longitudinally and interiorly of the sheath and being concentric therewith and having an objective lens at its distal end, an inflow conduit extending longitudinally and interiorly of the sheath above the telescope tube and having its distal end distal to the objective lens, an external connection at the proximate end of the inflow conduit, the interior of the sheath below the conduit providing an outflow conduit having its distal end proximate to the objective lens, and a second external connection at the proximate end of the sheath which communicates with the outflow conduit.

2. A urological endoscopic instrument, comprising an elongated cylindrical beaked sheath through which an instrument is extended axially to a position outside the sheath for performing a urological procedure, a telescope tube extending longitudinally and interiorly of the sheath and having an objective lens at its distal end, an inflow conduit extending longitudinally and interiorly of the sheath above the telescope tube and being formed by the upper wall of the sheath and a second wall spaced inwardly of the sheath therefrom and having its distal end distal to the objective lens, an external connection at the proximate end of the inflow conduit, the interior of the sheath below the conduit providing an outflow conduit having its distal end proximate to the objective lens, and a second external connection at the proximate end of the sheath which communicates with the outflow conduit.

* * * * *